United States Patent
Berger et al.

[15] 3,660,672
[45] May 2, 1972

[54] POWER SUPPLY DUAL OUTPUT

[72] Inventors: James K. Berger, Sherman Oaks; Bruce L. Wilkinson, Torrance, both of Calif.

[73] Assignee: Pioneer Magnetics, Inc., Santa Monica, Calif.

[22] Filed: Feb. 25, 1971

[21] Appl. No.: 118,661

[52] U.S. Cl. ............................307/17, 307/33, 323/8, 323/22 T, 321/27
[51] Int. Cl. ........................................................H02m 7/24
[58] Field of Search................321/2, 27; 307/12, 17, 31–37; 323/8, 9, 22 T

[56] References Cited

UNITED STATES PATENTS

| | | |
|---|---|---|
| 3,287,623 | 11/1966 | Valancius...........................323/22 T |
| 3,083,301 | 3/1963 | Turner................................307/33 X |
| 3,569,818 | 3/1971 | Dahlinger et al....................307/17 X |

Primary Examiner—Gerald Goldberg
Attorney—Jessup & Beecher

[57] ABSTRACT

A power supply is provided which produces a plurality of separate unidirectional output voltages of different degrees of regulation as determined by the requirements of the equipment energized thereby. The power supply includes a transformer and a regulating network, and it produces a first regulated unidirectional potential output; and the power supply also includes a circuit for obtaining at least one additional regulated unidirectional potential output from the same transformer and regulator.

5 Claims, 2 Drawing Figures

INVENTORS:
James K. Berger
Bruce L. Wilkinson

ATTORNEYS

3,660,672

POWER SUPPLY DUAL OUTPUT

BACKGROUND OF THE INVENTION

The situation often arises wherein electronic equipment requiring a multiplicity of unidirectional power supply exciting voltages does not require equally good regulation on all the unidirectional voltages. For example, a computer may require, inter alia, a +(15 ± 1 percent) unidirectional voltage, and a −(12 ± 17 percent) unidirectional voltage. If the variation of the input voltage to the power supply exceeds the regulation required for the more poorly regulated output, that is, if the input power voltage variations exceed ± 17 percent, in the example given above, then a separate regulator is required for each output in the prior art power supply, so that cost, size and weight of the power supply is increased materially.

A principal object of the present invention is, as mentioned above, to provide a circuit in a power supply for obtaining at least one additional regulated unidirectional voltage output from the original transformer and regulator in the power supply, which are used therein to generate a first regulated unidirectional voltage output; thereby effecting substantial cost, size, and weight saving as compared with a power supply in which two separate regulators and transformers are required.

The circuit and system of the present invention finds particular utility in the "flyback" type power supplies such as described in Copending application Ser. No. 58,042, which was filed in the name of James K. Berger, on July 24, 1970, and which is assigned to the assignee of the present application. It also finds utility in other power supplies in which regulation is accomplished on the input side of a transformer, such as in the full-wave pulse-width modulated type of power supplies. In such power supplies in the prior art, a separate transformer and separate power transistors are usually required for each separate unidirectional voltage output. However, and as mentioned above, the circuit of the present invention provides for at least two separate unidirectional potential outputs from a single transformer and power transistor regulator network.

DETAILED DESCRIPTION OF THE ILLUSTRATED EMBODIMENT

Figure 1:
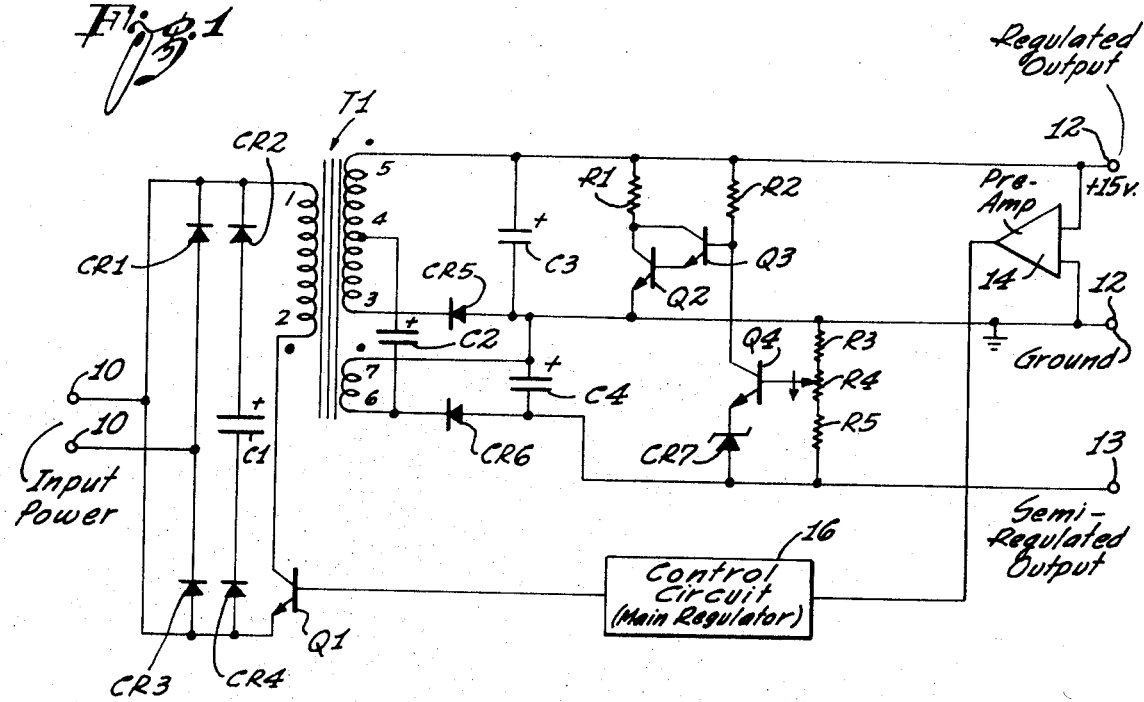
FIG. 1 is a circuit diagram of a power supply circuit of the flyback type, such as disclosed in the aforementioned copending application, and which has been modified to incorporate one embodiment of the invention.

The circuit of FIG. 1 includes details of the flyback type of power supply in order to illustrate the concepts and principles of the invention. The input power to the power supply is applied across the input terminals 10, and these terminals are connected through diodes CR1 and CR2 to one side of the primary winding of a transformer T1; and through diodes CR3 and CR4 to the emitter of an NPN power transistor Q1, the collector of which is connected to the other side of the primary winding. The diodes CR1–CR4 may each be of the type designated 1N4721, and the transistor Q1 may be of the type designated DTS411. A capacitor C1 having a capacitance, for example, of 3,000 microfarads is connected to one side of the primary winding of the transformer T1 and to the emitter of the transistor Q1.

The transformer T1 has a secondary winding which is connected through a diode CR5 to the output terminals 12. One of the output terminals 12 is connected to a point of reference potential, and a 15 volt regulated unidirectional potential output may be obtained across the output terminals. A capacitor C3 is connected to one side of the secondary winding and to the anode of the diode CR5. The capacitor C3 may have a capacity, for example, of 6,800 microfarads, and the diode CR5 may be of the type designated 1N1184R.

A pair of resistors R1 and R2 is connected to the ungrounded output terminal 12. The resistor R1 may have a resistance of 10 ohms, and the resistor R2 may have a resistance of 2.7 kilo-ohms. The resistor R1 is connected to the collector of an NPN transistor Q2, the emitter of which is grounded. The resistor R2, on the other hand, is connected to the base of an NPN transistor Q3 and to the collector of an NPN transistor Q4. The collector of the transistor Q3 is connected to the collector of the transistor Q2, and its emitter is connected to the base of the transistor Q2. The transistor Q2 may be of the type designated 2N4921, and the transistors Q3 and Q4 may each be of the type designated 2N5172.

The transformer T1 has a tertiary winding which is connected through a diode CR6 to a further output terminal 13. A −12 volt semi-regulated output voltage, for example, is obtained between the terminal 13 and the grounded terminal 12. The diode CR6 may be of the type designated 1N1184R. One side of the tertiary winding is grounded, and a capacitor C4 is connected between the terminal 13 and ground. The capacitor C4 may have a capacity of 6,800 microfarads. The emitter of the transistor Q4 is connected through a Zener diode CR7 to the terminal 12. The diode CR7 may be of the type designated 1N753. A resistor R3, a potentiometer R4 and a resistor R5 are connected across the terminals 12 and 13. The resistor R3 may have a resistance of 360 ohms, the potentiometer R4 may have a resistance of 250 ohms, and the resistor R5 may have a resistance of 560 ohms. The potentiometer is connected to the base of the transistor Q4.

A pre-amplifier 14 is connected across the output terminals 12, and its output is connected to a control circuit 16 which constitutes the main regulator for the power supply. The output of the control circuit 16 is connected to the base of the power transistor Q1.

In the operation of the power supply illustrated in FIG. 1, input alternating current power is rectified by a bridge rectifier formed by the diodes CR1, CR2, CR3, CR4 and the resulting rectified voltage is filtered by the capacitor C1. The capacitor C1, for example, normally is charged to a value of 150 volts DC. The power transistor Q1 operates as a switch, and it causes current to flow intermittently through the primary winding of the transformer T1. This current increases linearly with time due to the inductance of the transformer T1, and when the current reaches a preset amplitude, the control circuit 16 causes Q1 to become non-conductive. The energy stored in the transformer T1 is then released to the load capacitor C3 through the secondary winding, and through the diode CR5.

The pre-amplifier 14 senses the resulting unidirectional output voltage across the terminals 12, and compares it with a pre-set reference voltage. When the output is below a desired threshold, the control circuit 16 cyclically causes the transistor Q1 to become conductive and non-conductive, thereby causing energy alternately to be stored in the transformer T1 and then released to the regulated output circuit. When this transfer of energy has charged the capacitor C3 to a value slightly above the desired output level, the control circuit 16 holds the transistor Q1 non-conductive until the output voltage across the terminals 12 falls to the desired level.

Then the circuit undergoes one cycle of operation whereby the transistor Q1 is again rendered conductive to permit the transformer T1 to store energy, and is then rendered non-conductive to cause the transformer T1 to release the energy into the output circuit and thereby restore the charge on the capacitor C3 to a value slightly above the desired output voltage threshold. The power supply then remains in a quiescent state until the capacitor C3 again discharges down to the desired level. Thus, under different load conditions the circuit operates to maintain the output voltage across the terminals 12 at a desired regulated value.

It will be appreciated that the frequency of operation of the regulator circuit in the power supply of the drawing is related to the load demand, since the energy transferred on each cycle of operation is essentially constant, and each cycle of operation occurs when the energy transferred during the previous cycle is exhausted by the load.

As mentioned above, should a second regulated output be required from the prior art power supplies, a separate transformer and associated regulator circuit would be required. However, in the practice of the present invention, the semi-regulated output across the terminals 13 and 12 is achieved by the provision of the tertiary winding to the transformer T1, and its associated rectifier diode CR6 and load capacitor C4. In addition, the current balance circuit of the transistors Q2, Q3 and Q4 is provided. Now, when the transformer T1 discharges into the load capacitor C3, the tertiary winding causes current to flow into the additional load capacitor C4, through the diode CR6. The capacitor C4 will then charge to a voltage, and the ratio of the voltages across the capacitors C4 and C3 will be determined by the ratio of turns in the tertiary and secondary windings of the transformer T1.

Therefore, the circuit may be designed to provide any desired voltage level for the semi-regulated voltage output across the terminals 13, 12; and this latter output will be maintained at a voltage related to the regulated voltage output, as determined by the turns ratio of the tertiary and secondary windings of the transformer T1. The foregoing obtains if the loads on the regulated and semi-regulated outputs are substantially the same. However, if the semi-regulated output across the terminals 13, 12 is not loaded, and the regulated output is heavily loaded, the semi-regulated output will tend to be driven to an excessively high voltage, due to the presence of voltage spikes across the tertiary winding caused by the leakage inductance of the transformer T1, and due to the forward recovery time of the diode CR4.

A capacitor C2 having a value, for example, of 6,800 microfarads is connected to a tap on the secondary winding and to the common connection between the diode CR6 and the tertiary winding to suppress the aforesaid spikes and to prevent the semi-regulated output from being driven overvoltage when lightly loaded. The tap on the secondary winding is chosen, such that the number of turns between the tap and the upper side of the secondary is essentially equal to the number of turns of the tertiary winding. The capacitor C2, in effect, causes improved coupling of the tertiary winding to the secondary winding, thereby reducing the over-shoot of the tertiary winding when it is much less heavily loaded than the secondary winding.

Figure 2:
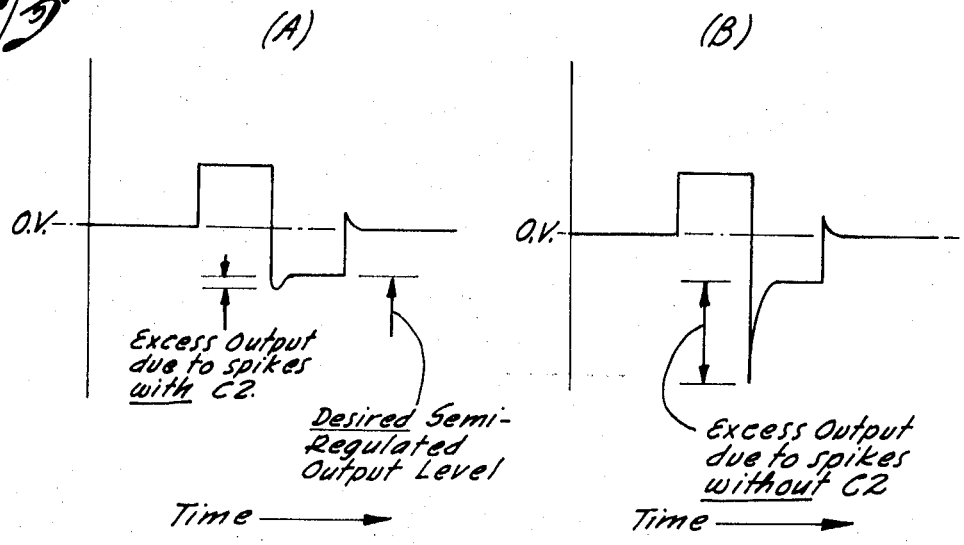
FIG. 2 is a representation of curves useful in explaining the operation of a compensating circuit in the power supply of FIG. 1.

The curve A of FIG. 2 shows the wave shape at the cathode of the diode CR6 when the capacitor C2 is incorporated into the circuit, whereas the curve B in FIG. 2 shows the spikes which occur when the capacitor C2 is omitted. When the load across the semi-regulated output terminals 13, 12 is light, the capacitor C4 will peak charge to the peak value of the spike, which without the capacitor C2, and as shown by the curve B OF FIG. 2, may be more than 200 percent of the desired value. However, when the capacitor C2 is incorporated into the circuit, the spike is normally less than 105 percent of the desired output.

The circuit of the transistors Q2, Q3 and Q4 is provided to form a current balance circuit, and to obviate a further difficulty. For example, if the load across the output terminals 12 is light, or if there is no load across these terminals, the regulator frequency would then be very low. Now, should the load across the output terminals 13, 12 be heavy at this time, an excessively high amplitude ripple would occur on the latter output, so that its average output voltage could fall below the acceptable level. This ripple occurs because the regulator frequency, under these conditions, is too low for the capacitor C4 to filter properly under the heavy load conditions of the semi-regulated output across the terminals 13, 12. The current balance circuit of the transistors Q2, Q3 and Q4 overcomes this condition by providing a dummy load to the regulated output across the terminals 12 when the semi-regulated output amplitude across the terminals 13, 12 falls below its preset threshold. The current balance circuit of the transistors Q2, Q3 and Q4 operates in a manner described in the following paragraph.

The Zener diode CR7 and the base-emitter junction of the transistor Q4 forms a reference voltage. The semi-regulated output voltage across the terminals 13, 12 is divided by the voltage divider formed by the elements R3, R4 and R5, and this voltage is compared with the reference voltage by the transistor Q4. If the semi-regulated output across the terminals 13, 12 is above the preset level, the transistor Q4 is caused to be conductive. Now, all the current through the resistor R2 flows through the transistor Q4 and through the Zener diode CR7, and the transistors Q3 and Q2 are not conductive.

However, if the semi-regulated output voltage across the terminals 13, 12 should fall below the preset level, the transistor Q4 is rendered less conductive, and some or all of the current through the resistor R2 flows into the base of the transistor Q3, causing the transistor Q3 to become conductive which, in turn, causes the transistor Q2 to become conductive. This results in a current flow through the resistor R1 and the transistor Q2 which serves as a dummy load for the regulated output.

This dummy load causes an increase in the frequency of operation of the regulator circuit, and this frequency becomes high enough for the capacitor C4 to operate as an effective filter, and it permits sufficient energy to be transferred to the capacitor C4 to maintain the semi-regulated output at the desired level. Therefore, the dummy load circuit operates to cause the frequency of operation of the regulator to be maintained at just the proper rate to hold the semi-regulated output at the preset level, under the conditions where the regulated load is small or zero.

It will be appreciated that the function of the current balance circuit of the transistors Q2, Q3 and Q4 could be performed by the resistor R1 alone, merely by connecting that resistor in parallel with the capacitor C3 so as to provide a constant dummy load to the regulated output, and thereby establishing a minimum frequency of operation. However, an advantage of the automatically controlled current balance circuit of the transistors Q2, Q3 and Q4 is that the dummy load is used only when the regulated output load is low, and its does not require additional power output capacity from the regulated output. This is because the dummy load is present only when the regulated output is not fully loaded with its normal load.

Although the system of the invention has been described in conjunction with the flyback type of power supply such as described in the aforementioned copending Berger application Ser. No. 58,042; it is applicable to other types of power supply in which regulation is applied to the primary side of the power supply transformer, such as the pulse-modulated power supplies mentioned previously herein. The invention is also applicable to both positive and negative outputs, and naturally to voltages other than 15 and 12 volts, such as were used in the example of FIG. 1.

Therefore, while a particular embodiment of the invention has been described, modifications may be made, and it is intended to cover all such modifications in the following claims.

What is claimed is:

1. In a power supply system for converting input power into regulated direct-current output power, and which includes a transformer having a primary winding and a secondary winding; input circuitry for connecting said primary winding to said source of input power; output circuitry connected to said secondary winding for producing a first unidirectional potential output; and voltage regulator circuitry connected to said output circuitry for sensing the amplitude of said first unidirectional potential output and further connected to said input circuitry to control the current flow in said primary winding and thereby regulate said first potential output; the combination of: a tertiary winding on said transformer, further output circuitry connected to said tertiary winding for producing a second regulated unidirectional potential output, and capacitor means connected to said tertiary winding and to said secondary winding effectively to improve the coupling between said secondary and tertiary windings.

2. The combination defined in claim 1, in which the turns ratio between said tertiary winding and said secondary winding corresponds to the voltage ratio of said second regulated unidirectional potential output and said first unidirectional potential output.

3. The combination defined in claim 1, in which said capacitor is connected to one side of said tertiary winding and to a tap on said secondary winding.

4. The combination defined in claim 1, in which said capacitor is connected to one side of said tertiary winding and to a tap on said secondary winding, and in which the turns of said secondary winding between said tap and one side of said unidirectional winding correspond to the turns of said tertiary winding.

5. The combination defined in claim 1, and which includes a dummy load circuit connected across said first-named output circuit, and in which said dummy load circuit is further connected to said further output circuitry and is responsive to the voltage level of said second unidirectional potential output to control the load exerted thereby across said first-named output circuitry.

* * * * *